United States Patent
Bard

[19]

[11] Patent Number: 5,963,298
[45] Date of Patent: *Oct. 5, 1999

[54] CONTACT LENS WITH UNNATURAL GRAPHIC DESIGN

[76] Inventor: David C. Bard, 1246 Defoors Ct., Atlantic, Ga. 30318

[*] Notice: This patent issued on a continued prosecution application filed under 37 CFR 1.53(d), and is subject to the twenty year patent term provisions of 35 U.S.C. 154(a)(2).

[21] Appl. No.: 08/779,037

[22] Filed: Jan. 6, 1997

[51] Int. Cl.[6] .................................................. G02C 7/04
[52] U.S. Cl. ............................................................ 351/162
[58] Field of Search .......................... 351/160 R, 160 H, 351/161, 162

[56] References Cited

U.S. PATENT DOCUMENTS

| | | | |
|---|---|---|---|
| 4,252,421 | 2/1981 | Foley, Jr. | 351/162 |
| 4,457,761 | 7/1984 | Sliger | 8/507 |
| 4,558,931 | 12/1985 | Fuhrman | 364/160 H |
| 4,669,834 | 6/1987 | Richter | 351/162 |
| 4,702,574 | 10/1987 | Bawa | 351/162 |
| 4,720,188 | 1/1988 | Knapp | 351/177 |
| 4,738,520 | 4/1988 | Neefe | 351/162 |
| 4,867,552 | 9/1989 | Neefe | 351/162 |
| 4,889,421 | 12/1989 | Cohen | 351/162 |
| 4,923,480 | 5/1990 | Monestere | 8/507 |
| 4,955,709 | 9/1990 | Smith | 351/44 |
| 4,971,433 | 11/1990 | Neefe | 351/162 |
| 5,018,849 | 5/1991 | Su et al. | 351/162 |
| 5,059,018 | 10/1991 | Kanome | 351/162 |
| 5,106,182 | 4/1992 | Briggs et al. | 351/162 |
| 5,120,121 | 6/1992 | Rawlings et al. | 351/162 |
| 5,260,727 | 11/1993 | Oksman et al. | 351/162 |
| 5,737,056 | 4/1998 | Martin et al. | 351/177 |

*Primary Examiner*—Scott J. Sugarman
*Attorney, Agent, or Firm*—Womble Carlyle Sandridge & Rice

[57] ABSTRACT

A decorative contact lens for being worn in the eye of a wearer has a front surface that contains a decorative, wholly unnatural, and attention attracting graphic design. The design is printed as an array of small spaced apart opaque dots or lines that cover at least fifty percent of the field of the design to present a substantially opaque image to others viewing the wearer from a distance but to allow the wearer to see through the design.

7 Claims, 4 Drawing Sheets

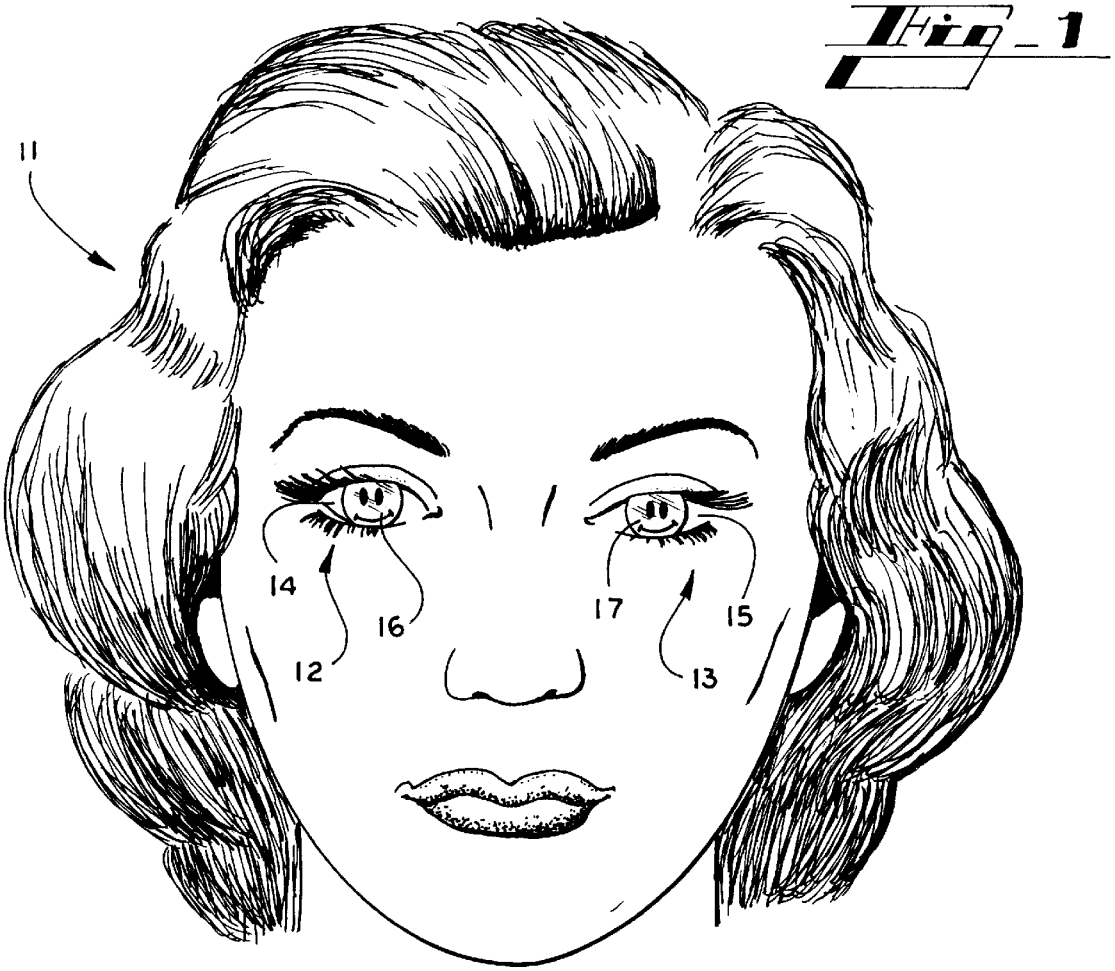
Fig_1
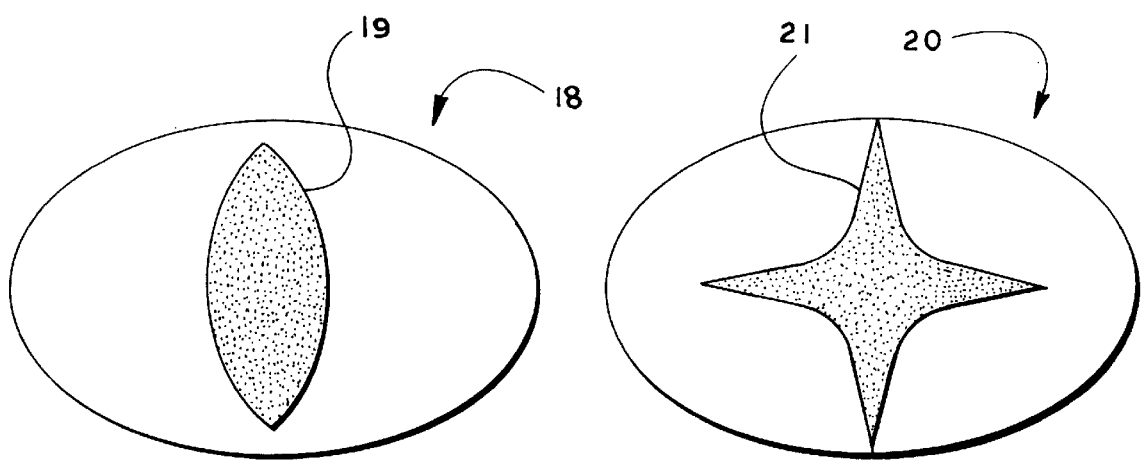
Fig_2A   Fig_2B

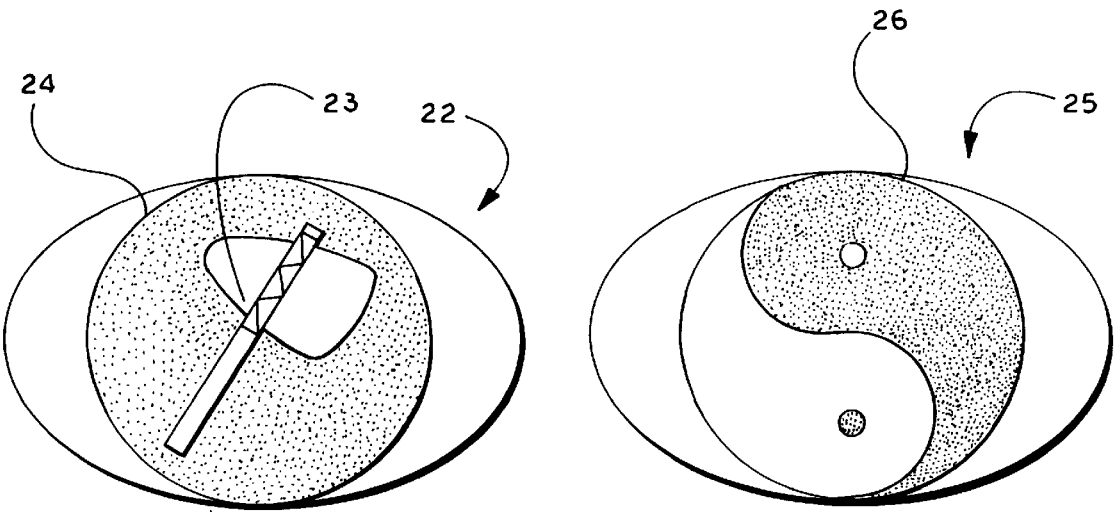
Fig_ 2C
Fig_ 2D
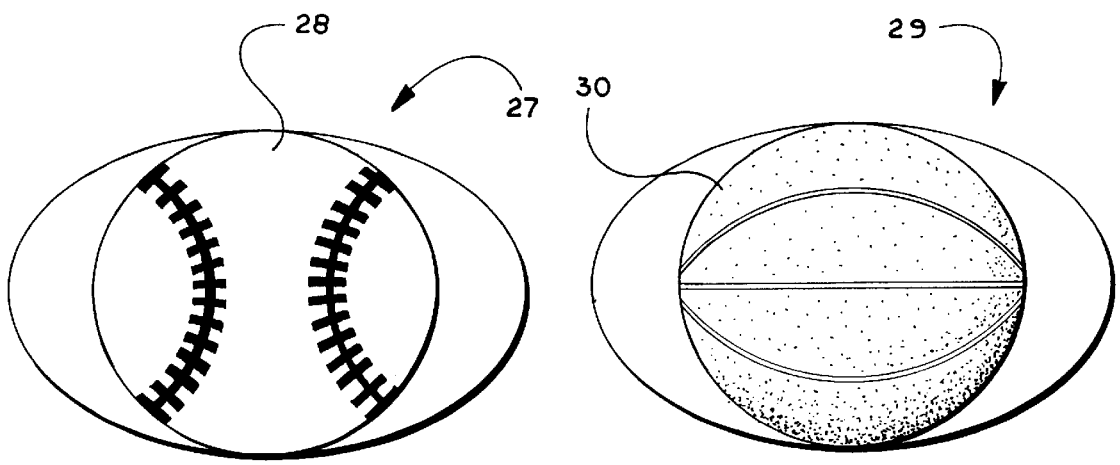
Fig_ 2E
Fig_ 2F

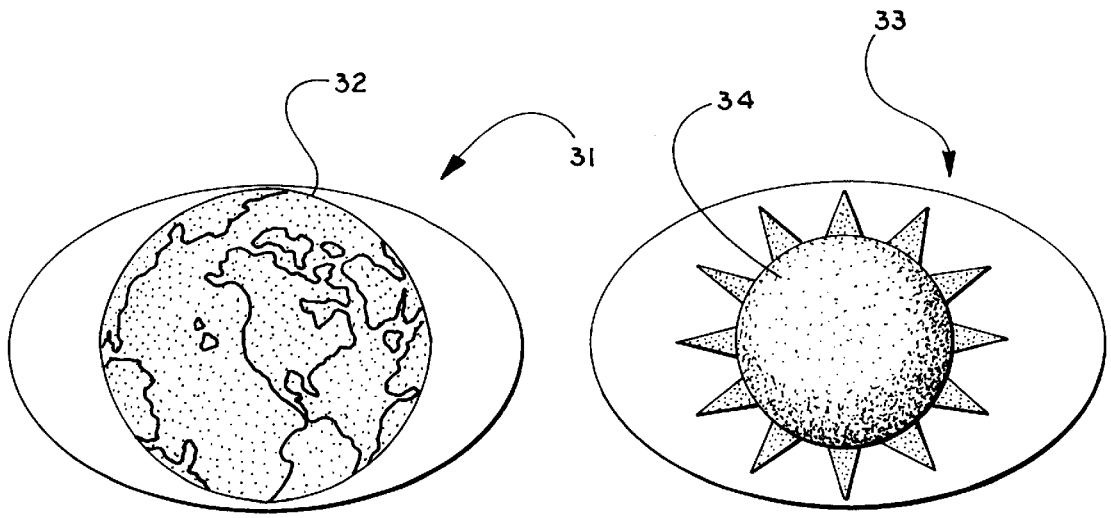
Fig_2G    Fig_2H
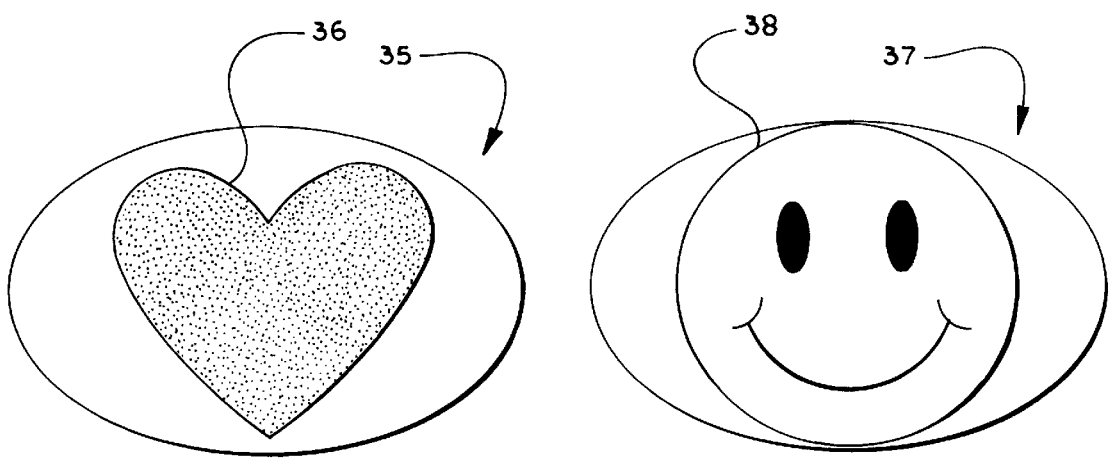
Fig_2I    Fig_2J

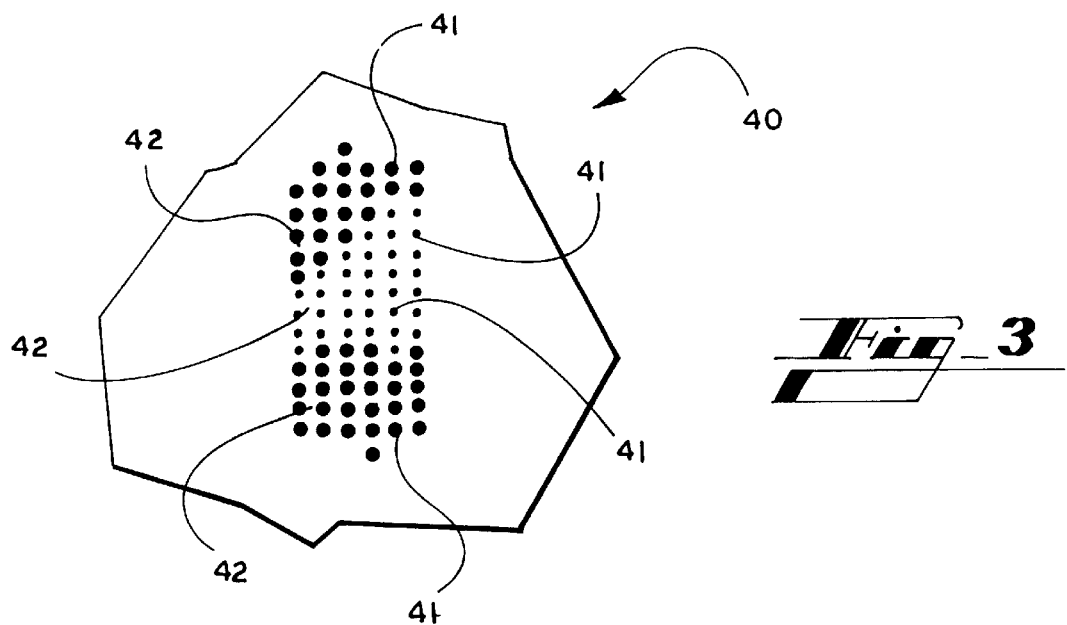
Fig_3
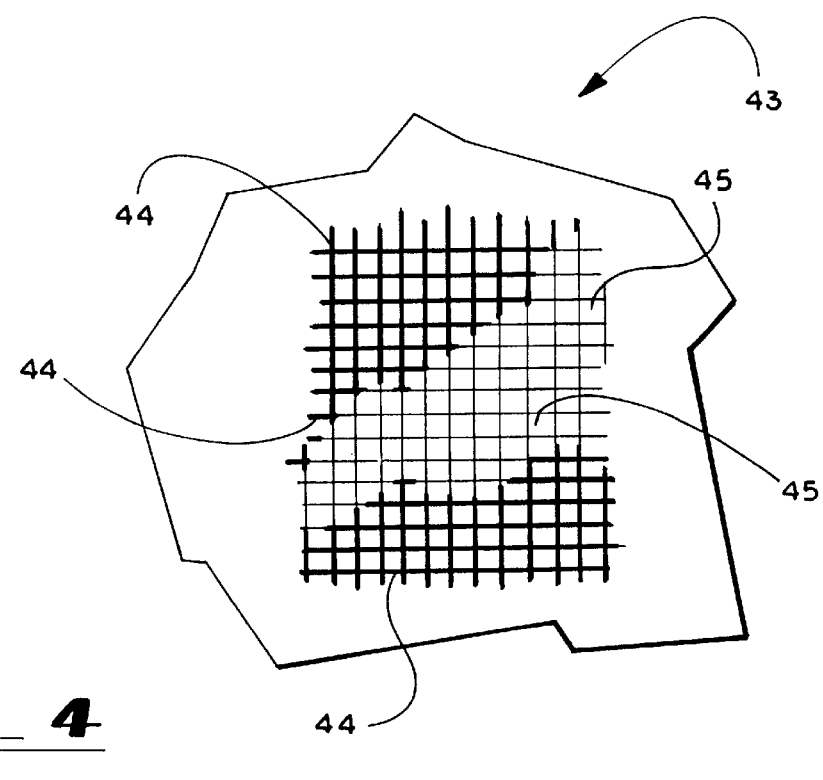
Fig_4

CONTACT LENS WITH UNNATURAL GRAPHIC DESIGN

TECHNICAL FIELD

This invention relates generally to contact lenses and more particularly to a contact lens that, when worn, presents a wholly unnatural attention attracting graphic design readily visible to others that covers the iris and pupil but that does not interfere with the wearer's vision.

BACKGROUND OF THE INVENTION

Contact lenses have been popular for many years as an alternative to glasses for the correction of the vision of a wearer. Initially, the purpose of the contact lens was, among other things, to eliminate the lenses and frames of traditional glasses, which many people considered to be unsightly, and to be substantially anonymous during use. Thus, such lenses were clear so as to be invisible under all but the closest examination.

More recently, contact lenses that can change the apparent color of the irises of a wearer have become popular. In general, these contact lenses have clear central portions that overlie a wearer's pupils and a translucent or textured colored or tinted portion that surrounds the central portion and overlies the wearer's irises. The tinted portion can be blue, green, brown, or another natural eye color and can be patterned to simulate the structure of a real iris. Some examples of such contact lenses are disclosed in U.S. Pat. Nos. 4,867,552 of Neefe, 4,971,433 of Neefe, 5,018,849 of Su et al., 5,120,121 of Rawlings et al., and 4,558,931 of Fuhrman. The purpose of the lenses of each of these patents is to present the appearance of a natural eye and to mask as much as possible the fact that the wearer is even wearing contacts. Further, each of these lenses is provided with a clear unobstructed central portion positioned to overlie the pupil of a wearer both to simulate a natural pupil and to allow the wearer to see clearly through the lens. In many cases, the iris portions are designed to allow the structure of the wearer's irises to show through the lens for an even more natural appearance.

In some cases, contact lenses have been tinted or silvered to block dazzling or harmful light and thus to act as sunglasses. The lenses disclosed in U.S. Pat. Nos. 5,059,018 of Kanome et al. and 4,669,834 of Richter are examples of such lenses. In the case of Kanome et al, a number or other insignia may be embedded within the tinted portion of the lens to render the lens easy to find if dropped and as an indication of the front and back of the lens. However, is intended that the insignia not be visible during use and it is thus printed in a non-contrasting tint and is small relative to the area of the lens.

Even though contact lenses meant to appear natural when worn have been available, the inventor perceives a desire among certain groups of the public for a contact lens whose very purpose and intent is not to present a natural eye appearance but instead to present a wholly unnatural, surprising, and attention attracting appearance. It is to the provision of such a contact lens that the present invention is primarily directed.

SUMMARY OF THE INVENTION

Briefly described, the present invention, in a preferred embodiment thereof, comprises a novelty contact lens set adapted to be placed in the eyes of a wearer and to present a completely unnatural appearance in the form of a decorative graphic image readily visible to others. In one embodiment, the graphic image covers the entire iris and pupil of the wearer. To allow the user to see through the lenses, the graphic image on each lens is printed with a pattern or array dots in much the same way as newspaper print. The size and resolution of the dots is preselected so that the wearer of the contact lens is able to see through the graphic image with little impairment of vision. However, to others viewing the wearer from a distance of more than a few inches, the graphic image appears solid and opaque, completely hiding and replacing the iris and pupil of the wearer.

In another embodiment, the graphic image printed on the contact lens is still wholly unnatural, but incorporates a clear portion of the image in the center of the lens. The clear portion preferably is incorporated into the graphic of the image and permits a clear line of sight through the lens. In this embodiment, the other parts of the image can be opaque, semi-opaque, or can be printed with arrays of small dots. In any event, the contact lenses themselves can be cosmetic or corrective and are sized to extend beyond the edges of the wearer's irises to cover and conceal the iris completely.

The various graphic designs that can be used with the present invention are virtually limitless. However some preferred designs are disclosed and discussed in the detailed description set forth below.

Thus, it is an object of this invention to provide a contact lens that presents a wholly unnatural and attention attracting appearance when worn in the eyes of a wearer.

Another object of the invention is to provide contact lenses printed with decorative graphic images that overlie and cover the irises and pupils of a wearer to replace the irises and pupils with the graphic image printed on the lenses.

A further object of the invention is to provide a unique and new means of adorning the human body.

A still further object of the invention is to provide a novelty item that can be worn in the eyes of wearer to draw attention to himself or herself or to show support for a specified cause.

These and other objects, features, and advantages of this invention will become more apparent upon review of the detailed description set forth below when taken in conjunction with the accompanying drawings, which are briefly described as follows.

BRIEF DESCRIPTION OF THE DRAWINGS

FIG. 1 is a front view of the face of a wearer having the contact lenses of the present invention applied in her eyes.

FIGS. 2A through 2J illustrate alternate embodiments of decorative graphic images that can be printed on the surfaces of contact lenses to form the present invention.

FIG. 3 is a magnified section of a graphic image on the present invention illustrating the array of contrasting density dots that can be used to print the graphic images.

FIG. 4 is a magnified section of a graphic image on the present invention illustrating how the image might be printed with a cross hatched pattern of lines to permit vision through the image.

DETAILED DESCRIPTION OF THE PREFERRED EMBODIMENTS

Referring now in more detail to the drawings, wherein like numerals refer to like portions and parts throughout the several views, FIG. 1 depicts a wearer of the present invention. The wearer 11 has a right eye 12 and a left eye 13. The right eye 12 has a white portion or sclera 14 and an iris and pupil that are not visible in FIG. 1. Similarly, the left eye 13 has a sclera 15 and an iris and pupil that are not visible in FIG. 1. A contact lens 16 that embodies principles of this invention is positioned in the right eye 12 and covers the iris and the pupil of that eye. Preferably, the contact lens 16 has a diameter that is slightly larger than the diameter of the wearer's iris so that the iris is completely covered and no part of the iris is visible about the periphery of the contact lens.

According to the present invention, the contact lens 16 is printed with a graphic design that is decorative and wholly unnatural in that it does not simulate the appearance of any natural attribute of the human eye. In FIG. 1, the graphic design is a "smiley face" that preferably has black eyes and a black mouth printed on a yellow background. As detailed below, the graphic design is printed on the surface of the contact lens and is composed of an array of small dots or small cris-crossed lines separated by clear areas in a manner similar to the way in which photographs are printed in a newspaper. The individual dots are appropriately colored and have appropriate densities such that, from a normal viewing distance, they project the graphic image printed on the contact lens. However, the wearer is able to see through the printed graphic design with the only effect being perhaps a reduction in light intensity akin to that produced by a pair of sunglasses.

Similarly, the left eye 13 of the wearer 11 is provided with a contact lens 17 that adheres to the cornea and covers the iris and pupil of that eye. Contact lens 17 is identical to contact lens 16 in FIG. 1 and also has a diameter that is slightly larger than the diameter of the iris so that the iris is completely covered. While both contact lenses in FIG. 1 are illustrated with the same unnatural decorative graphic design, it will be understood that the designs can be different from each other according to the taste of the wearer.

It can be seen in FIG. 1 that the application of the contact lenses of this invention presents a wholly unnatural, striking, and attention attracting appearance. The contact lenses thus function as an adornment in much the same way as ear rings or other jewelry.

FIGS. 2A through 2J depict a variety of graphic designs that the inventor prefers for use with the present invention. It will be understood, however, that these examples are not exhaustive and that other or different designs might be selected within the scope of the invention.

FIG. 2A depicts a contact lens 18 with an elongated feline pupil design 19. In this design, the portion outside of the dark pupil area preferably is white, making it appear that the wearer has pupils like those of a cat or reptile. The white area covers the wearer's iris completely and blends with the wearer's white sclera to project the appearance of a feline eye.

FIG. 2B illustrates a contact lens 20 with a four pointed star design in its center, giving the appearance of a starburst in the wearers eyes. FIG. 2C illustrates a contact lens 22 having the design of a tomahawk 23 within a colored background circle 24. This design might, for example, be the mark of a sports team such as the Atlanta Braves. Wearing this design would signify support for the wearer's team. Obviously, other team insignias might also be printed in the background circle to represent support for other teams.

FIG. 2D illustrates a contact lens 25 with a Yen/Yang design, indicative of Eastern religious philosophy. FIGS. 2E and 2F illustrate contact lenses 27 and 29 with sports designs, in this case a baseball and a basketball respectively. These lenses might also be worn as a novelty at sporting events to show support for ones team. In the case of the baseball, the filed of the baseball could be white while the threads could be red to simulate a real baseball. The basketball could be orange with dark seam lines to simulate a basketball.

FIG. 2G illustrates a contact lens 31 having a globe design 32 printed on the surface thereof. Preferably, the water portions of the globe design are colored blue while the land portions a colored green. Other combinations might, however, be used. This lens might be worn as a novelty to support ecological causes or to show support for an environmentally friendly lifestyle. FIG. 2H illustrates a contact lens 33 with a graphic representation of the sun in the center of the lens. Preferably, the sun is colored yellow. In the preferred embodiment, the central portion of the sun fades to a shade of white to give the design, and the wearer's eyes, a three dimensional look. Again, the lens is sized to cover the wearer's iris so that only the sun design is visible to another person looking at the wearer.

FIG. 2I illustrates a contact lens 35 having the design of a heart 35 emblazoned thereon. Preferably, the heart is a deep shade of red to provide an "eye catching" appearance when worn by a wearer. Finally, FIG. 2J illustrates the contact lens 37 that is shown in the eyes of the wearer of FIG. 1. This lens has the ubiquitous "smiley face" design having a round, preferably yellow, face and black eyes and mouth. The face is sized to cover the iris so that the only thing visible in the wearer's eyes is the smiley face design. This design might be worn to convey happiness or a festive mood at parties and other occasions.

FIG. 3 illustrates one preferred method of printing designs according to the present invention onto the outer surfaces of contact lenses. It is desired that the designs appear substantially opaque when viewed by another person from a viewing distance greater than about two feet. However, the wearer of the lens must be able to see through the printed design to avoid being blinded by the wearing of the contacts. In order to accomplish this dual requirement, it has been found that the graphic designs can be printed on the surface of the contact lenses with arrays of small spaced dots in much the same what that a photograph is printed in a newspaper.

FIG. 3 shows a small area 40 of a contact lens magnified substantially to reveal the structure of the dots. Each of the dots 41 has a predetermined density and a predetermined color corresponding to where in the graphic design the dot is positioned. For example, dense yellow dots might be used to create a yellow portion of the graphic design whereas less dense blue dots might be used to present a contrasting light blue portion of the design. In FIG. 3, the dots 41 are seen to form a small section of a larger design with lighter less dense dots in the center of the field and darker more dense dots at the top and bottom of the field. Only a few of the dots of the pattern are illustrated for simplicity of understanding in FIG. 3. It will be understood, however, that the field of dots extends beyond the bounds of the segment 40 to form the entire pattern.

The spacing of the dots is small enough so that that the pattern formed by the dots appears substantially opaque to others from a comfortable viewing distance but large enough so that the wearer is able to see through the design when wearing the contact lenses of this invention. In this regard, the dots should be sized and positioned so that the opaque dots themselves cover greater than about fifty percent of the field of the design and the interstices between the dots, through which the wearer can see, covers the balance of the field. The dots themselves should be small enough that they appear to merge into a continuous field from a distance of greater than about two feet. With such a configuration, the iris of the wearer is effectively covered and does not show through the dots from a distance of more than about two feet. However, since the field of the design is very near the surface of the wearer's cornea and lens, the wearer is able to see comfortably through the design with perhaps a diminution of light intensity similar to the effect of wearing sunglasses.

FIG. 4 illustrates an alternate method of printing the designs of this invention onto the surface of a contact lens. Here, a small segment 43 of the contact lens is shown with an even smaller segment of the design printed thereon, again highly magnified. In this embodiment the design is made up of a series of lines that have predetermined densities and colors that appear to combine or merge to form the overall shape and color of the design. There are two sets of such lines in FIG. 4, one horizontal set of lines and another set of intersecting vertically oriented lines. However, the image could be made up of all horizontal or all vertical lines or, indeed, lines extending in any arbitrary direction without intersecting. Thus, the intersecting line pattern of FIG. 4 should not be interpreted as a limitation of the present invention.

As with the dots of FIG. 3, the lines of FIG. 4 should be spaced closely enough to appear to merge and project a substantially opaque design from a distance but far enough apart to allow the wearer to see through the design. In this regard, greater than about fifty percent of the field should be covered with lines with the remainder of the field being covered with spaces between the lines and the size of the lines should be such that they appear to merge from a distance of more than about two feet.

It will thus be seen that the present invention provides a unique adornment for the human eye with the goal of presenting a wholly unnatural, decorative, and attention getting appearance of the eye. The lenses themselves can be standard corrective lenses to correct the vision of the wearer or can be cosmetic with no vision correcting attributes. Such lenses typically have a lens body with an inner surface that rests against the wearer's cornea to hold the lens in place and an outer surface opposite to the inner surface that is presented to others viewing the wearer from a distance. In most of the illustrated embodiments, the graphic design covers the entire iris and pupil of the wearer. However, the pupil area can be left uncovered by design elements if desired according to the particular design being used. Further, the design can be completely opaque at least in the iris area of the eye if desired with only the portion in the pupil area being printed with spaced dots or lines to permit the wearer to see through the design. These and other additions, deletions, and modifications might well be made to the exemplary embodiments illustrated in the forgoing specification without departing from the spirit and scope of the invention as set forth in the claims.

I claim:

1. A decorative contact lens for being worn in the eye of a wearer, said contact lens comprising a lens body which adheres to the cornea of the wearer's eye to hold said contact lens in place covering the iris and pupil of the wearer, and said contact lens containing an unnatural graphic design comprised of an array of substantially opaque dots spaced apart from each other, said opaque dots covering and substantially obscuring the iris and pupil of the wearer, whereby said design is readily visible to others from a distance while minimally affecting the vision of the wearer.

2. The decorative contact lens of claim 1, wherein said opaque dots cover at least fifty percent of the field of the iris and pupil to present a substantially opaque graphic design to others from a distance and to allow the wearer to see through said design.

3. The decorative contact lens of claim 2, wherein said dots have predetermined densities and colors that appear to merge to form said design when viewed from a distance.

4. A decorative contact lens for being worn in the eye of a wearer, said contact lens comprising a lens body that adheres to the cornea of the wearer's eye to hold said contact lens in place covering the iris and pupil of the wearer, said contact lens containing an unnatural graphic design readily visible to others, said design comprised of a first array of substantially opaque lines spaced apart from each other, said opaque lines covering and substantially obscuring the iris and pupil of the wearer to present said design to others from a distance while minimally affecting the vision of the wearer.

5. The decorative contact lens of claim 4, wherein said opaque lines cover at least fifty percent of the field of the iris and pupil to present a substantially opaque graphic design to others from a distance when said contact lens is being worn by the wearer and to allow the wearer to see through said design.

6. The decorative contact lens of claim 5, wherein said lines have predetermined densities and colors that appear to merge to form said design when viewed from a distance.

7. The decorative contact lens of claim 6, wherein said pattern further includes a second array of substantially opaque lines that intersect said first array of lines and wherein said first and second arrays of opaque lines together cover at least fifty percent of the iris and pupil of the wearer.

* * * * *